(12) United States Patent
Chen

(10) Patent No.: US 10,654,112 B1
(45) Date of Patent: May 19, 2020

(54) CUTTER HOLDER WITH REDUCED ASSEMBLY TOLERANCES

(71) Applicant: SHIN-YAIN INDUSTRIAL CO., LTD., Taichung (TW)

(72) Inventor: Pen-Hung Chen, Taichung (TW)

(73) Assignee: SHIN-YAIN INDUSTRIAL CO., LTD., Taichung (TW)

( * ) Notice: Subject to any disclaimer, the term of this patent is extended or adjusted under 35 U.S.C. 154(b) by 28 days.

(21) Appl. No.: 16/189,308

(22) Filed: Nov. 13, 2018

(51) Int. Cl.
*B23B 31/20* (2006.01)

(52) U.S. Cl.
CPC .... *B23B 31/201* (2013.01); *B23B 2231/2008* (2013.01); *B23B 2231/2091* (2013.01); *B23B 2231/36* (2013.01); *B23B 2260/126* (2013.01); *Y10T 279/17299* (2015.01); *Y10T 279/17384* (2015.01); *Y10T 279/17504* (2015.01)

(58) Field of Classification Search
CPC . B23B 31/20; B23B 31/201; B23B 2260/126; Y10T 279/17299; Y10T 279/17384; Y10T 279/17478; Y10T 279/17504
See application file for complete search history.

(56) References Cited

U.S. PATENT DOCUMENTS

| | | | | |
|---|---|---|---|---|
| 1,530,505 A | * | 3/1925 | Levedahl | F16B 39/32 411/144 |
| 2,685,631 A | * | 8/1954 | Scheller | B23K 9/296 219/75 |
| 5,567,093 A | * | 10/1996 | Richmond | B23B 31/001 277/619 |
| 5,984,595 A | * | 11/1999 | Mizoguchi | B23B 31/001 279/157 |
| 8,925,930 B2 | * | 1/2015 | Komine | B23B 31/20 279/42 |
| 9,144,846 B2 | * | 9/2015 | Bernardi | B23B 31/201 |
| 2009/0322042 A1 | * | 12/2009 | Kitamura | B23B 31/202 279/49 |
| 2011/0169230 A1 | * | 7/2011 | Babel | B23B 31/008 279/20 |
| 2017/0036275 A1 | * | 2/2017 | Haimer | B23B 31/028 |
| 2017/0189970 A1 | * | 7/2017 | Chen | B23B 31/005 |
| 2019/0118269 A1 | * | 4/2019 | Nakatani | B23B 31/20 |

* cited by examiner

*Primary Examiner* — Eric A. Gates
(74) *Attorney, Agent, or Firm* — Hershkovitz & Associates, PLLC; Abe Hershkovitz

(57) ABSTRACT

A cutter holder has a holder, a collet, and a nut. The holder has a first threaded portion having an external thread, a first abutting surface, a second abutting surface, at least one recess, and at least one sealing member. The at least one recess is recessed in the second abutting surface. The at least one sealing member is mounted in the at least one recess and partially protrudes from the second abutting surface. The nut has a second threaded portion having an internal thread, a third abutting surface, and a fourth abutting surface. The internal thread and the external thread are corresponding internal and external trapezoidal threads, respectively. The third abutting surface and the first abutting surface have a corresponding diameter with a clearance therebetween being less than 0.015 millimeter. The fourth abutting surface and the at least one sealing member are in an interference fit.

10 Claims, 10 Drawing Sheets

CUTTER HOLDER WITH REDUCED ASSEMBLY TOLERANCES

BACKGROUND OF THE INVENTION

1. Field of the Invention

The present invention relates to a cutter holder for a machining tool, and more particularly to a cutter holder that can improve the machining accuracy by reducing assembly tolerances thereof.

2. Description of Related Art

With reference to FIGS. 9 and 10, a conventional cutter holder has a holder 91, a collet 92, and a nut 93. The collet 92 is applied to clamp a cutter 80 and is mounted in the holder 91. The nut 93 is screwed with the holder 91 to fix the collet 92 inside the holder 91.

The conventional holder 91 is connected with the conventional nut 93 by means of threaded connection of corresponding external trapezoidal thread 911 and internal trapezoidal thread 931. However, due to the machining accuracy of the threads, a gap is formed between the external trapezoidal thread 911 of the holder 91 and the internal trapezoidal thread 931 of the nut 93. For example, the external trapezoidal thread 911 and the internal trapezoidal thread 931 have a thread pitch diameter PD of 39.25 millimeters and a thread pitch P of 1.5 millimeters. When the tolerance class of the internal trapezoidal thread 931 is 7H, the maximum limit of the thread pitch diameter PD of the internal trapezoidal thread 931 will be 39.424 millimeters. When the tolerance class of the external trapezoidal thread 911 is 7e, the minimum limit of the thread pitch diameter PD of the external trapezoidal thread 911 will be 39.183 millimeters, and the machining tolerance of the thread pitch P will be 0.17 millimeter. This will cause a maximum gap size of 0.461 millimeter between the thread pitch diameters PD of the external trapezoidal thread 911 and the internal trapezoidal thread 931. The gap between the external trapezoidal thread 911 and the internal trapezoidal thread 931 causes poor connection and eccentricity problem. The cutter holder will have poor balance and vibration problem during rapid spinning, and machining accuracy of the machining tool is reduced.

To overcome the shortcomings, the present invention tends to provide a cutter holder to mitigate or obviate the aforementioned problems.

SUMMARY OF THE INVENTION

The main objective of the invention is to provide a cutter holder with reduced tolerances that can perform machining precisely.

The cutter holder has a holder, a collet, and a nut. The holder has a conical recess recessed in the end surface of the front end of the holder and a first threaded portion formed around an outer surface of the holder and located at the front end of the holder. The first threaded portion has an external thread, a first abutting surface, a second abutting surface, at least one recess, and at least one sealing member. The external thread is an external trapezoidal thread and has a major diameter and a root diameter. The first abutting surface is adjacent to the external thread away from the end surface of the front end of the holder, and has a diameter larger than the major diameter of the external thread. The second abutting surface is adjacent to the external thread near the end surface of the front end of the holder, and has a diameter smaller than the root diameter of the external thread. The at least one recess is recessed in the second abutting surface. The at least one sealing member is mounted in the at least one recess and partially protrudes from the second abutting surface. The collet is mounted in the conical recess of the holder. The nut is screwed with the holder, and has a second threaded portion formed around an inner surface of the nut and engaged with the first threaded portion by threaded connection. The second threaded portion has an internal thread, a third abutting surface, and a fourth abutting surface. The internal thread is an internal trapezoidal thread corresponding to the external thread. The third abutting surface corresponds to the first abutting surface in position, and a clearance formed between the first abutting surface and the third abutting surface is less than 0.015 millimeter. The fourth abutting surface corresponds to the at least one sealing member in position, wherein the fourth abutting surface and the at least one sealing member are in an interference fit. Other objects, advantages and novel features of the invention will become more apparent from the following detailed description when taken in conjunction with the accompanying drawings.

DETAILED DESCRIPTION OF PREFERRED EMBODIMENT

Figure 1:
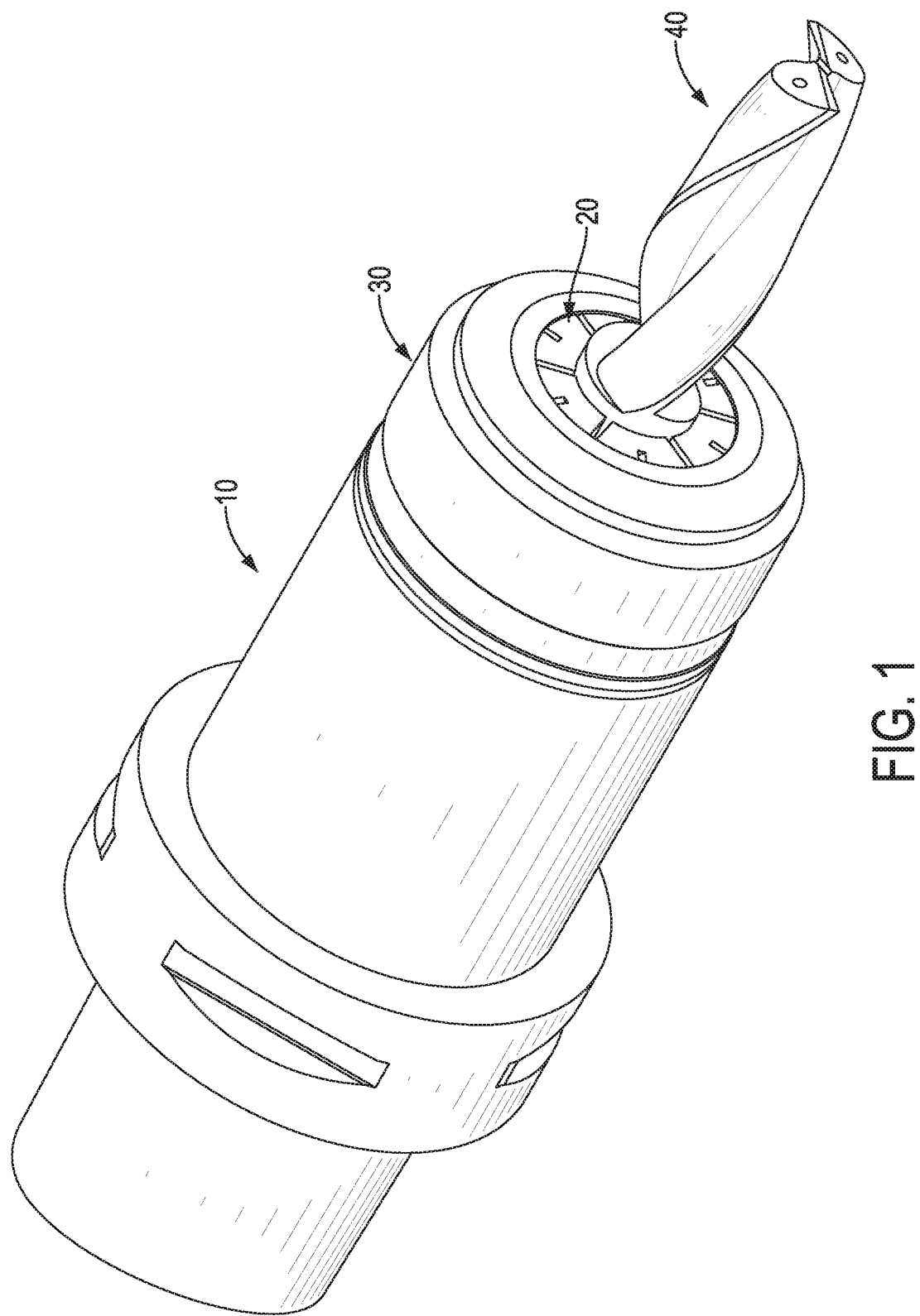
FIG. 1 is a perspective view of a first embodiment of a cutter holder in accordance with the present invention.
Figure 2:
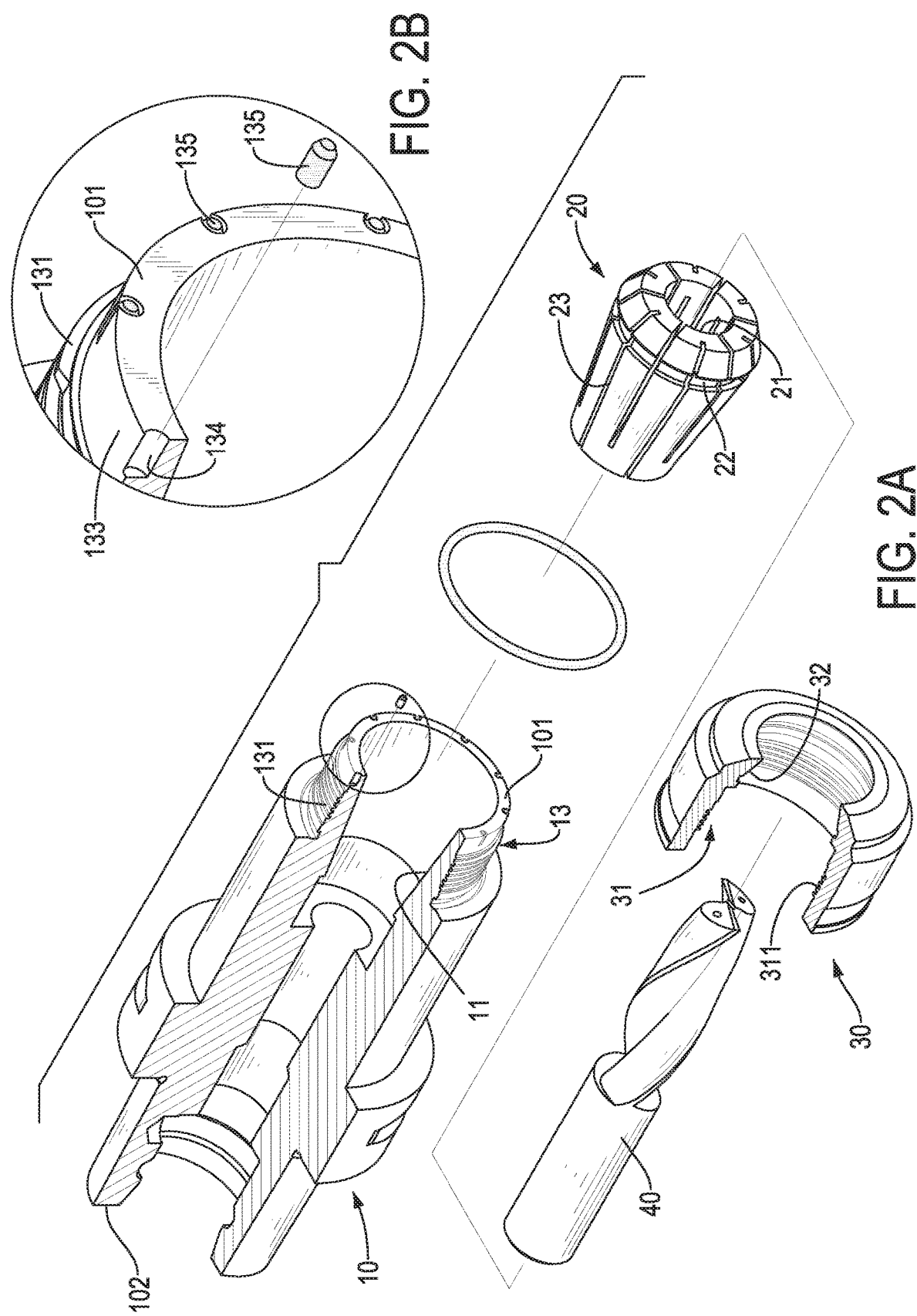
FIG. 2A is an exploded perspective view in partial section of the cutter holder in FIG. 1.
FIG. 2B is an enlarged exploded perspective view of the cutter holder in FIG. 2.
Figure 3:
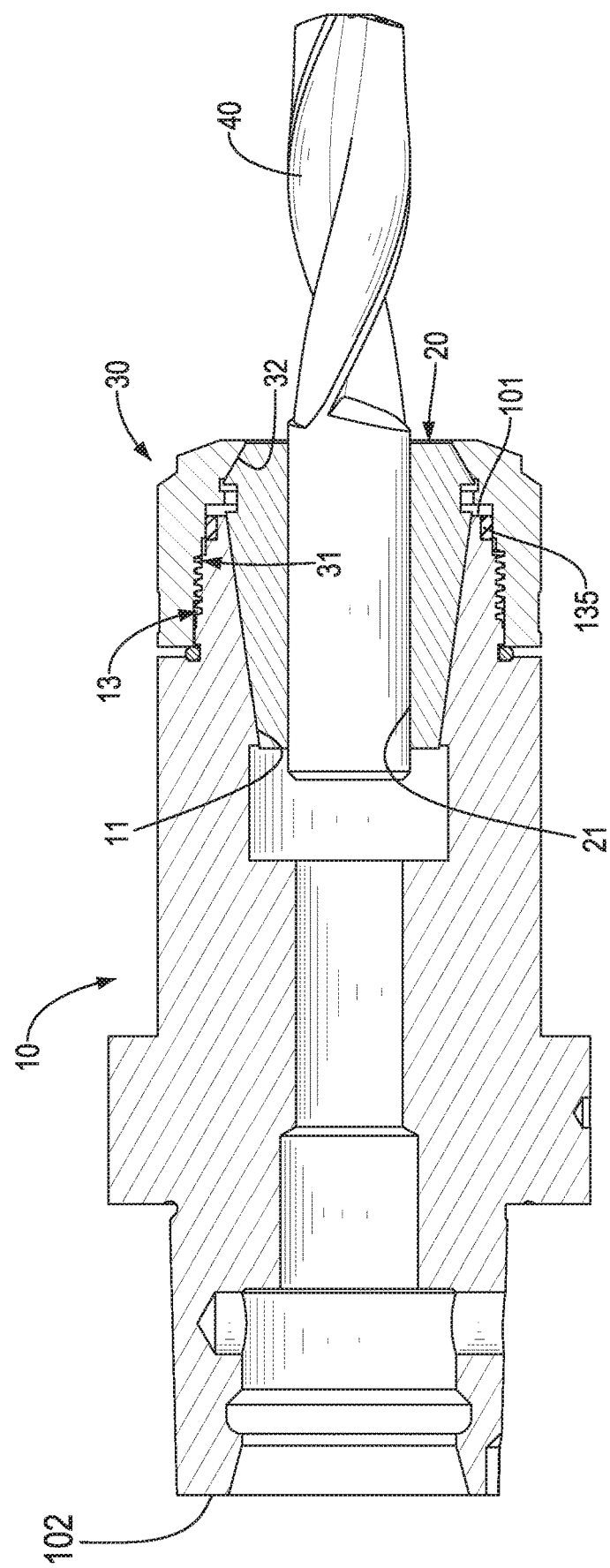
FIG. 3 is a side view in partial section of the cutter holder in FIG. 1.

With reference to FIGS. 1 to 4, a first embodiment of a cutter holder in accordance with the present invention has a holder 10, a collet 20, and a nut 30. The holder 10 has a front end 101, a rear end 102, a conical recess 11, and a first threaded portion 13. The conical recess 11 is recessed in an end surface of the front end 101 of the holder 10. The first threaded portion 13 is formed around the outer surface of the holder 10 and is located at the front end 101 of the holder 10. The first threaded portion 13 has an external thread 131, a first abutting surface 132, a second abutting surface 133, at least one recess 134, and at least one sealing member 135. The external thread 131 is an external trapezoidal thread having a major diameter D1 and a root diameter D2. The first abutting surface 132 is adjacent to the external thread 131 away from the end surface of the front end 101, and the second abutting surface 133 is adjacent to the external thread 131 near the end surface of the front end 101. The first abutting surface 132 has a diameter larger than the major diameter D1 of the external thread 131. The second abutting surface 133 has a diameter smaller than the root diameter D2 of the external thread 131. The at least one recess 134 is recessed in the second abutting surface 133. The at least one sealing member 135 is mounted in the at least one recess 134 and partially protrudes from the second abutting surface 133.

In the first embodiment, the first threaded portion 13 has multiple recesses 134 and multiple sealing members 135, and the amount of the recesses 134 is not less than the amount of the sealing members 135. The recesses 134 are arranged around the second abutting surface 133 at equiangular intervals, are longitudinally defined in the second abutting surface 133, and each recess 134 has a top opening formed in the second abutting surface 133 and an end opening formed in the end surface of the front end 101. The sealing members 135 are respectively mounted in the recesses 134, and each sealing member 135 is a cylindrical elastomer. Preferably, the width of the top opening of each recess 134 formed in the second abutting surface 133 is smaller than a diameter of each sealing member 135, whereby each sealing member 135 may be inserted into a respective one of the recesses 134 from the end opening of the recess 134, the outer surface of each sealing member 135 protrudes from the second abutting surface 133, and the sealing members 135 may not easily escape from the recesses 134.

The collet 20 is mounted in the conical recess 11 of the holder 10, and has a front end, a rear end, a clamping hole 21, an annular groove 22, and multiple slits 23. The collet 20 is inserted in the conical recess 11 from the rear end of the collet 20, is formed as a cone, and corresponds to the conical recess 11 in shape. The clamping hole 21 is defined axially in the collet 20 and is applied to clamp the cutter 40. The annular groove 22 is defined around and recessed in the outer surface of the collet 20 and is located near the front end of the collet 20 at a position outside of the holder 10. The slits 23 are defined radially in the collet 20 and are arranged around the clamping hole 21 at angular intervals. The slits 23 allow flexible deformation of the collet 20 to clamp the cutter 40 tightly.

The nut 30 is screwed with the holder 10 by threaded connection and has a second threaded portion 31 and a collet abutting portion 32. The second threaded portion 31 and the collet abutting portion 32 are formed around the inner surface of the nut 30. The second threaded portion 31 is engaged with the first threaded portion 13 by threaded connection, and has an internal thread 311, a third abutting surface 312, and a fourth abutting surface 313. The internal thread 311 is an internal trapezoidal thread corresponding to the external thread 131 in position and thread shape. The third abutting surface 312 is adjacent to the internal thread 311 and corresponds to the first abutting surface 132 in position. The third abutting surface 312 has a diameter corresponding to the diameter of the first abutting surface 132 in size, and a clearance formed between the third abutting surface 312 and the first abutting surface 132 is less than 0.015 millimeter to limit the eccentricity allowance of the connection between the holder 10 and the nut 30. The fourth abutting surface 313 is adjacent to the internal thread 311 and corresponds to the sealing members 135 in position, and has a diameter corresponding to the diameter of the second abutting surface 133 in size. The fourth abutting surface 313 and each of the sealing members 135 are in an interference fit to eliminate the radial clearance between the nut 30 and the holder 10. The collet abutting portion 32 is adjacent to the second threaded portion 31 away from the holder 10, corresponds to the front end of the collet 20 in shape and position, and is applied to abut and fix the collet 20.

Figure 5:
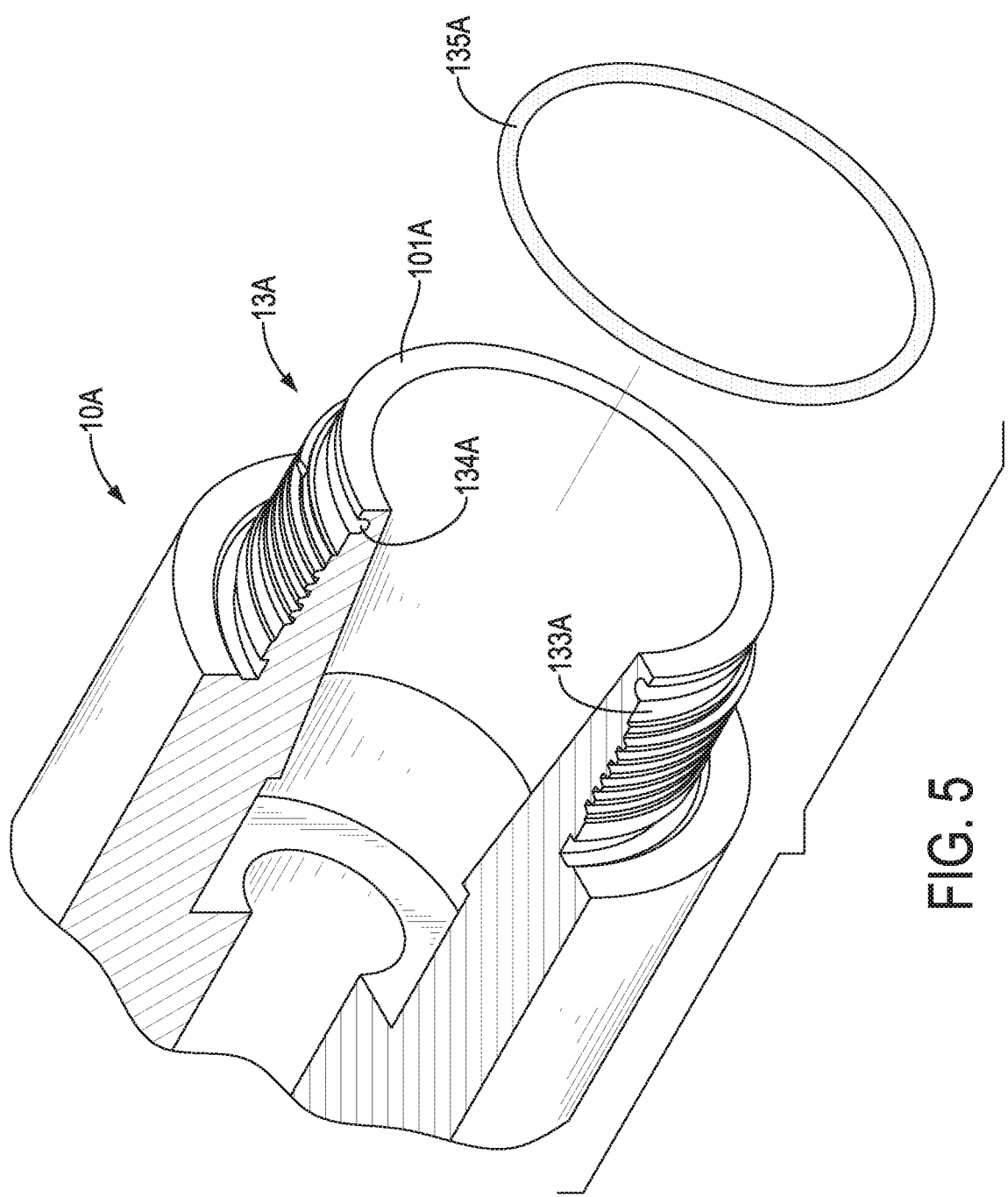
FIG. 5 is an enlarged exploded perspective view in partial section of a second embodiment of a holder of a cutter holder in accordance with the present invention.
Figure 6:
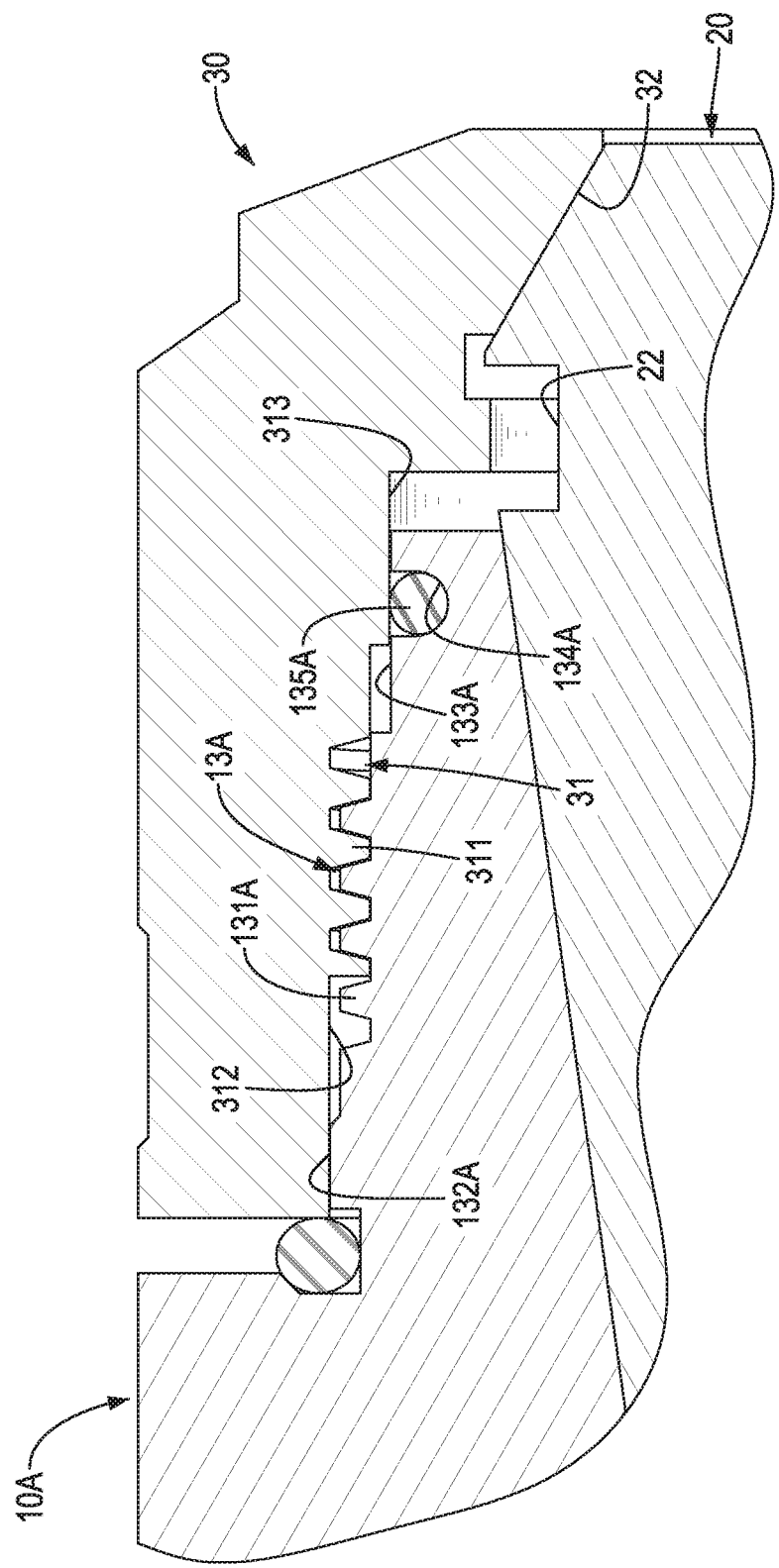
FIG. 6 is an enlarged cross sectional side view of the cutter holder in FIG. 5.

With reference to FIGS. 5 to 6, the first threaded portion 13A of a second embodiment of the cutter holder in accordance with the present invention has one recess 134A and one sealing member 135A. The recess 134A is recessed around the second abutting surface 133A, and has a spaced interval with the end surface of the front end 101A. The sealing member 135A is an O-ring elastomer and is mounted in the recess 134A, and the outer surface of the sealing member 135A partially protrudes from the second abutting surface 133A. The fourth abutting surface 313 of the nut 30 and the sealing member 135A are in an interference fit.

Figure 7:
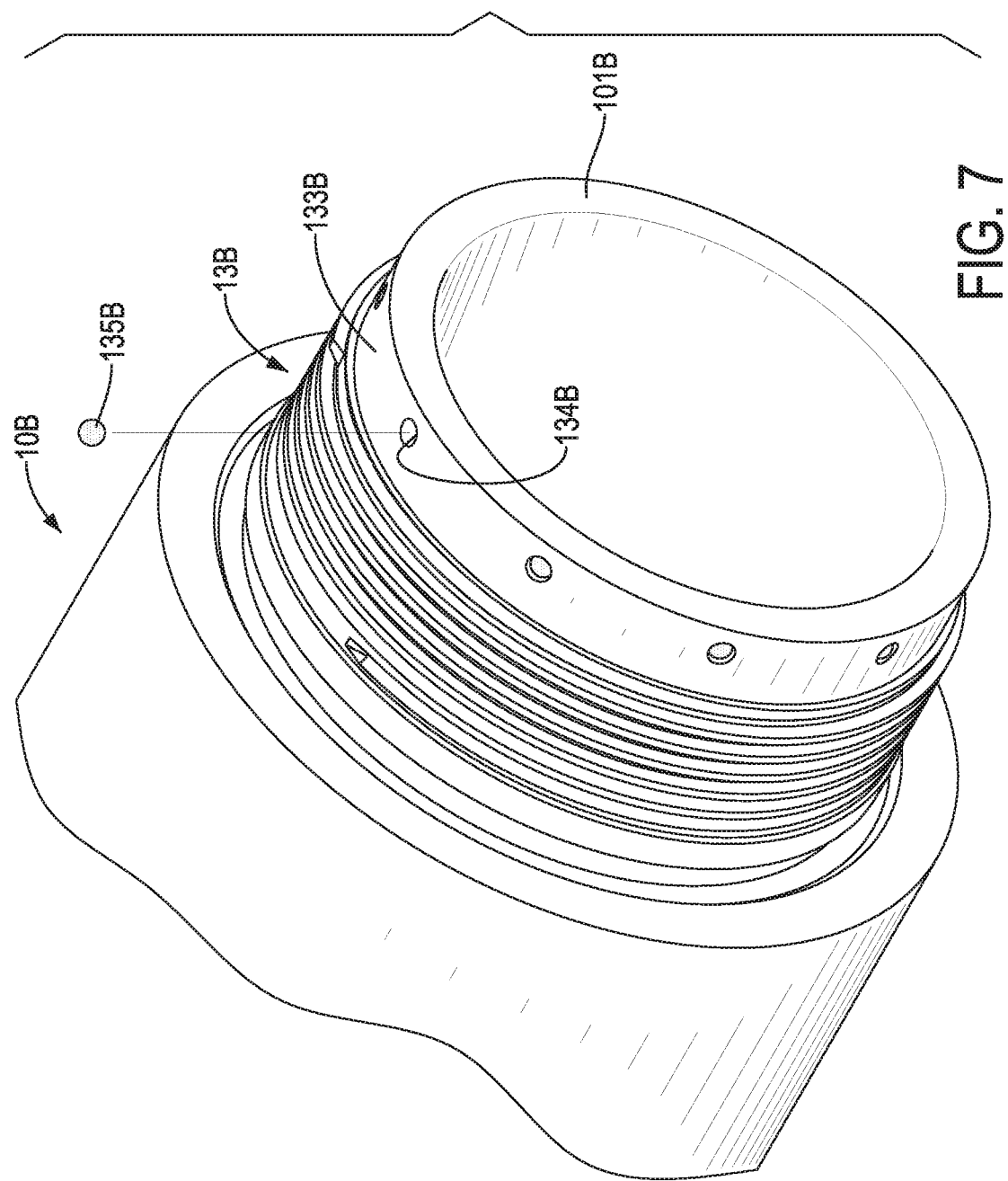
FIG. 7 is an enlarged exploded perspective view of a third embodiment of a holder of a cutter holder in accordance with the present invention.
Figure 8:
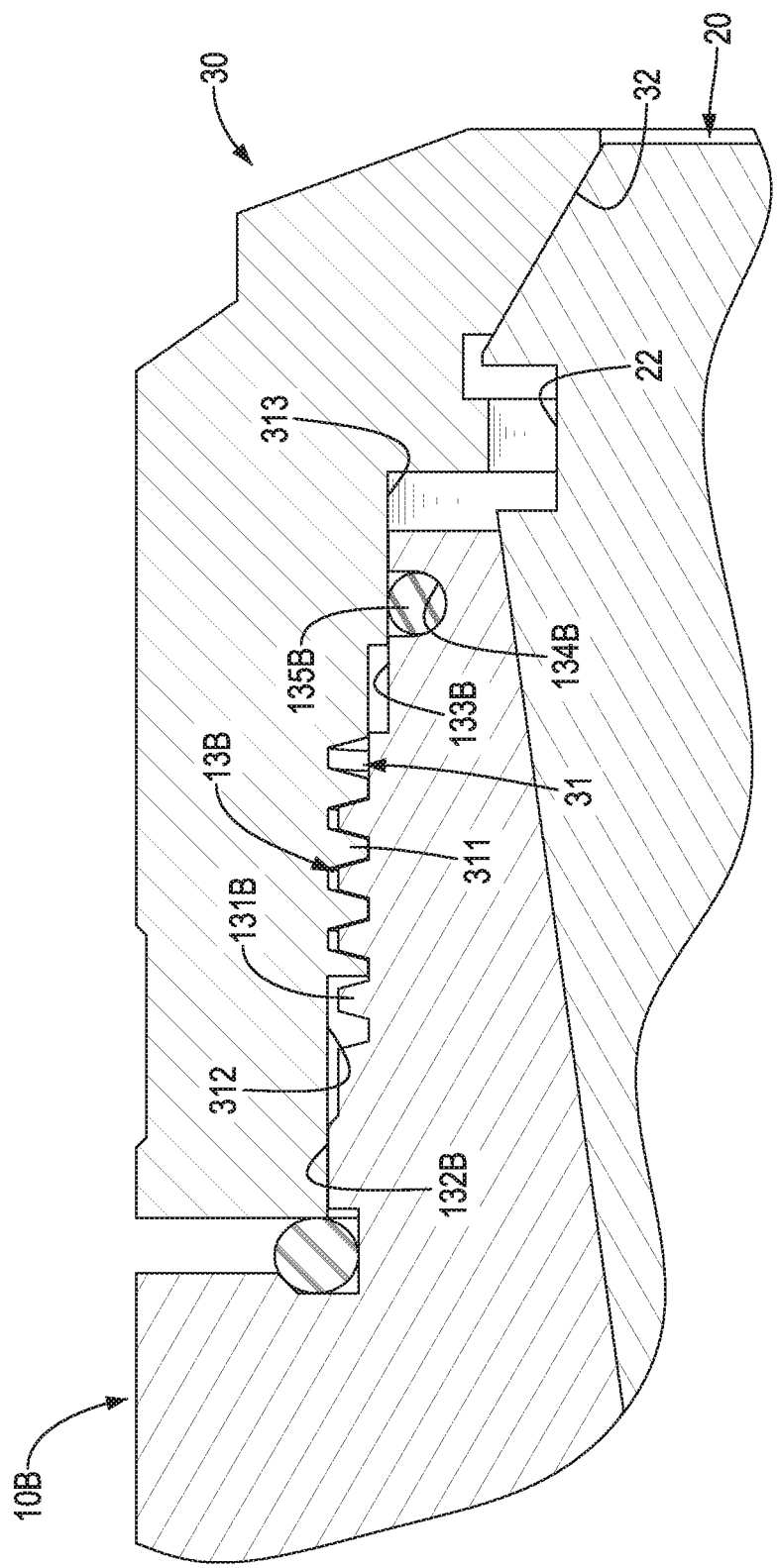
FIG. 8 is an enlarged cross sectional side view of the cutter holder in FIG. 7.
Figure 9:
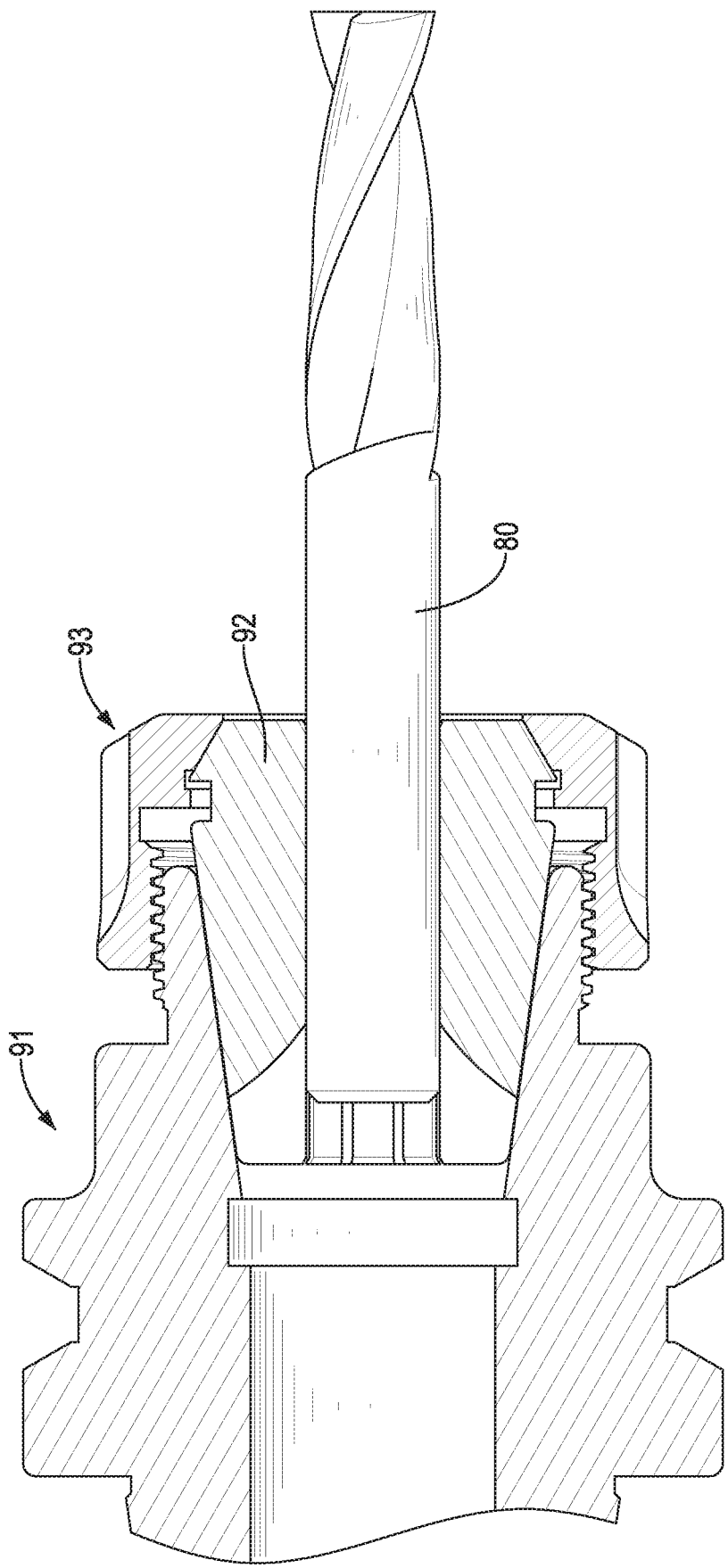
FIG. 9 is a side view in partial section of a conventional cutter holder.
Figure 10:
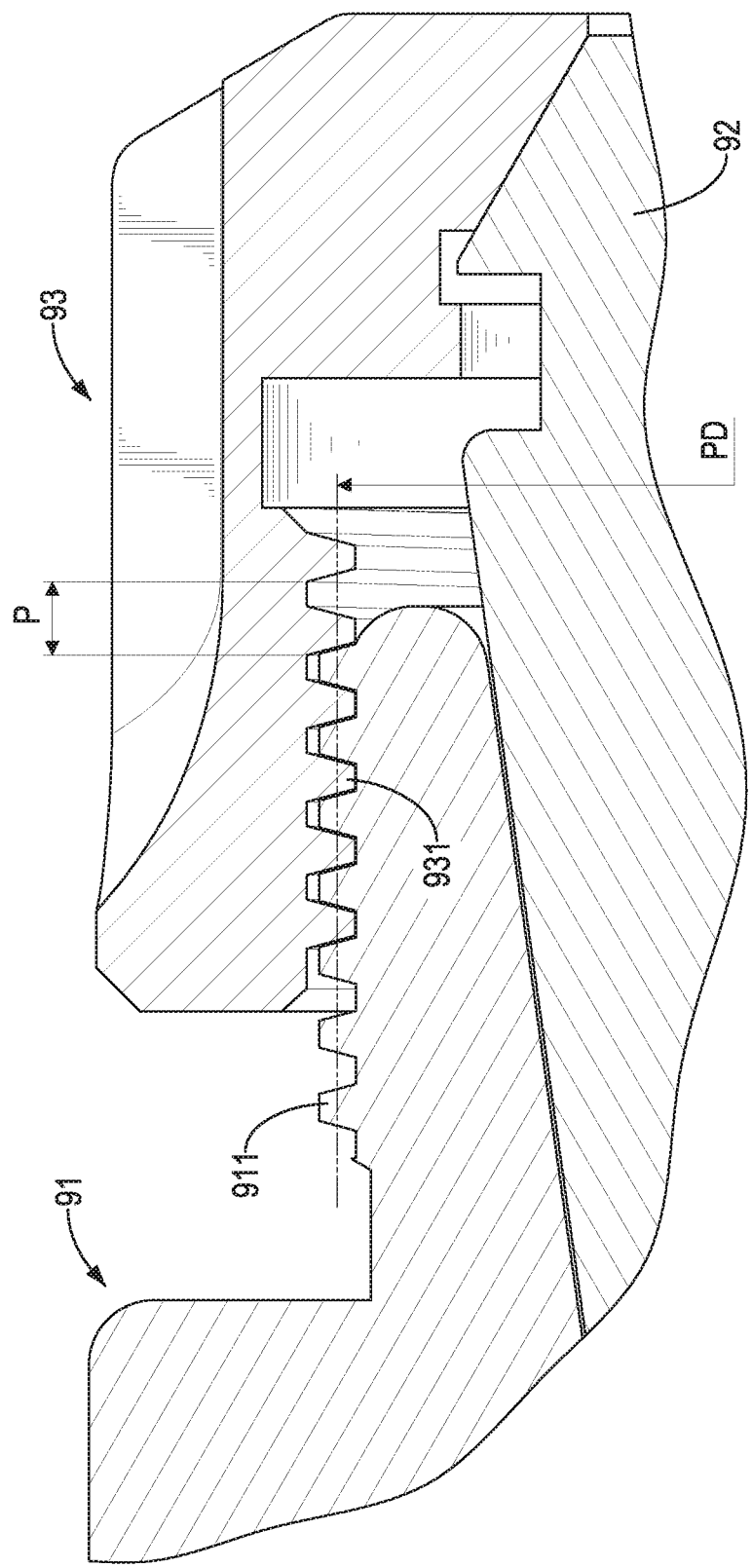
FIG. 10 is an enlarged cross sectional side view of the conventional cutter holder in FIG. 9.

With reference to FIGS. 7 to 8, the first threaded portion 13B of a third embodiment of the cutter holder in accordance with the present invention has multiple recesses 134B and multiple sealing members 135B, and the amount of the recesses 134B is not less than the amount of the sealing members 135B. The recesses 134B are arranged around and recessed in the second abutting surface 133B at equiangular intervals, and each recess 134B has a spaced interval with the end surface of the front end 101B. Each sealing member 135B is a ball elastomer and is mounted in a respective one of the recesses 134B, and the outer surface of each sealing member 135A partially protrudes from the second abutting surface 133B. The fourth abutting surface 313 of the nut 30 and each sealing member 135B are in an interference fit.

Figure 4:
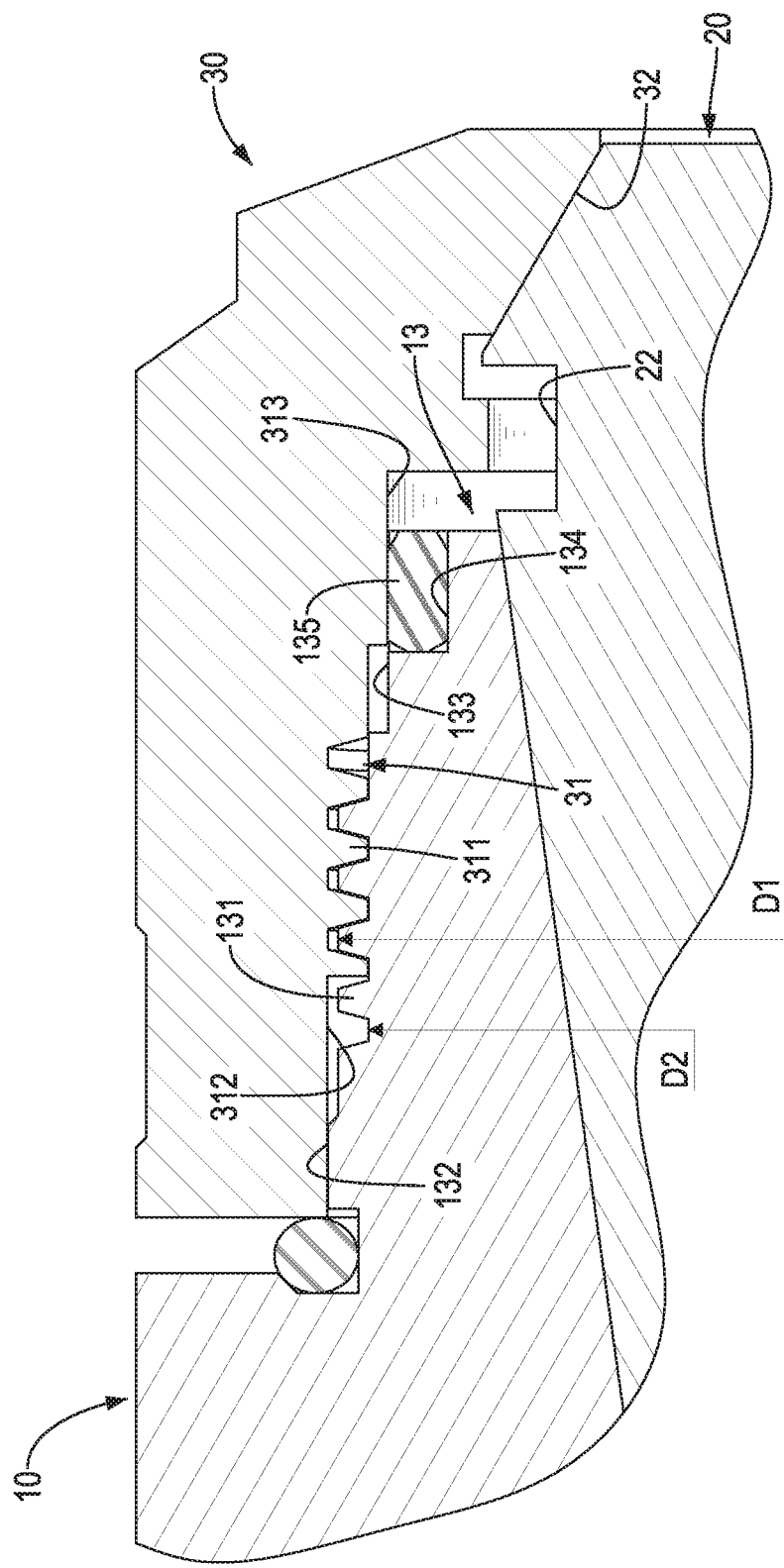
FIG. 4 is an enlarged cross sectional side view of the cutter holder in FIG. 3.

With reference to FIGS. 4, 6 and 8, when the holder 10, 10A, 10B and the nut 30 are screwed with each other by the threaded connection of the external thread 131, 131A, 131B of the first threaded portion 13, 13A, 13B and the internal thread 311 of the second threaded portion 31, the clearance between the first abutting surface 132, 132A, 132B and the third abutting surface 312 is less than 0.015 millimeter to limit the eccentricity allowance of the connection between the holder 10, 10A, 10B and the nut 30. Moreover, the fourth abutting surface 313 and the at least one sealing member 135, 135A, 135B disposed in the second abutting surface 133, 133A, 133B are in an interference fit, such that the radial clearance between the nut 30 and the holder 10, 10A, 10B is eliminated. The cutter holder in accordance with the present invention can eliminate influences of the gap between the external thread 131, 131A, 131B and the internal thread 311 which is formed by machining accuracy, and has the following advantages. The holder 10, 10A, 10B and the nut 30 will be connected firmly, and the eccentricity between the holder 10, 10A, 10B and the nut 30 will be reduced. While rapidly spinning, the cutter holder will have good balance and the vibration problem will be reduced, and the machining accuracy processed by the cutter holder in accordance with the present invention will be improved.

What is claimed is:
1. A cutter holder comprising:
  a holder having
    a front end having an end surface;
    a rear end;
    an outer surface;
    a conical recess recessed in the end surface of the front end of the holder;

a first threaded portion formed around the outer surface of the holder, located at the front end of the holder, and having
an external thread defined as an external trapezoidal thread and having a major diameter and a root diameter;
a first abutting surface being adjacent to the external thread away from the end surface of the front end of the holder and having a diameter larger than the major diameter of the external thread;
a second abutting surface being adjacent to the external thread near the front end of the holder and having a diameter smaller than the root diameter of the external thread;
at least one recess recessed in the second abutting surface; and
at least one sealing member mounted in the at least one recess and partially protruding from the second abutting surface;
a collet mounted in the conical recess of the holder; and
a nut screwed with the holder and having
a second threaded portion formed around an inner surface of the nut, engaged with the first threaded portion of the holder by threaded connection, and having
an internal thread defined as an internal trapezoidal thread corresponding to the external thread of the holder in position and thread shape;
a third abutting surface being adjacent to the internal thread, corresponding to the first abutting surface of the holder in position, and having a clearance formed between the third abutting surface of the nut and the first abutting surface of the holder being less than 0.015 millimeter; and
a fourth abutting surface being adjacent to the internal thread and corresponding to the at least one sealing member in position, wherein the fourth abutting surface of the nut and the at least one sealing member of the holder are in an interference fit.

2. The cutter holder as claimed in claim 1, wherein the holder includes multiple recesses and multiple sealing members, and an amount of the recesses is not less than an amount of the sealing members;
the recesses are arranged around the second abutting surface at angular intervals;
each recess has a top opening formed in the second abutting surface; and
the sealing members are respectively mounted in the recesses.

3. The cutter holder as claimed in claim 2, wherein the recesses of the holder are longitudinally defined in the second abutting surface of the holder, and each sealing member is a cylindrical elastomer.

4. The cutter holder as claimed in claim 3, wherein each recess of the holder further has an end opening formed in the end surface of the front end of the holder, and a width of the top opening of each recess of the holder is smaller than a diameter of each sealing member of the holder.

5. The cutter holder as claimed in claim 4, wherein the recesses of the holder are arranged around the second abutting surface at equiangular intervals.

6. The cutter holder as claimed in claim 3, wherein the recesses of the holder are arranged around the second abutting surface at equiangular intervals.

7. The cutter holder as claimed in claim 2, wherein each recess of the holder has a spaced interval with the end surface of the front end of the holder, and each sealing member is a ball elastomer.

8. The cutter holder as claimed in claim 7, wherein the recesses of the holder are arranged around the second abutting surface at equiangular intervals.

9. The cutter holder as claimed in claim 2, wherein the recesses of the holder are arranged around the second abutting surface at equiangular intervals.

10. The cutter holder as claimed in claim 1, wherein the holder includes one recess and one sealing member;
the recess of the cutter is recessed around the second abutting surface and has a spaced interval with the end surface of the front end of the holder; and
the sealing member is an O-ring elastomer.

* * * * *